Inventor:
G Eberhard Michelsen,
by Harry E. Dunham
His Attorney.

Patented Jan. 26, 1937

2,069,077

UNITED STATES PATENT OFFICE 2,069,077

TWO-SPEED CAPACITOR MOTOR

G. Eberhard Michelsen, Fort Wayne, Ind., assignor to General Electric Company, a corporation of New York Application July 31, 1936, Serial No. 93,629

6 Claims. (Cl. 172—278)

My invention relates to two-speed split-phase motors and its object is to provide such motors in which the two speeds are obtained with simple connections using the same phase-splitting device for starting and, where the phase splitter is modified or cut out after starting, the same switching arrangement may be used for the different speeds. Likewise, if a capacitor is used for power-factor improvement while running, the same capacitor may be used for the two different speeds. The two different speeds may be in the same or opposite directions of rotation.

Figure 1:
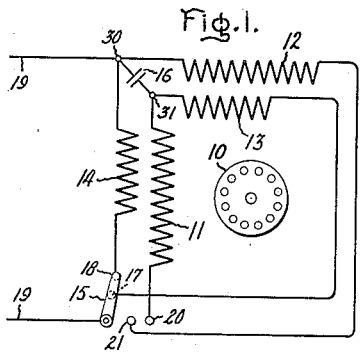
Figure 2:
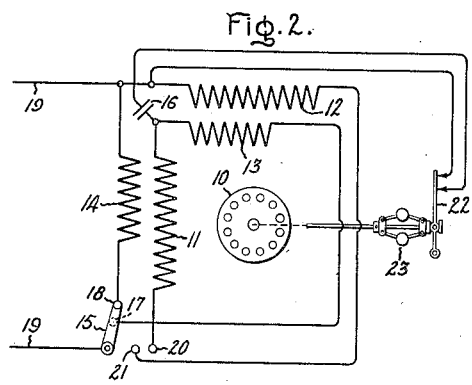
Figure 3:
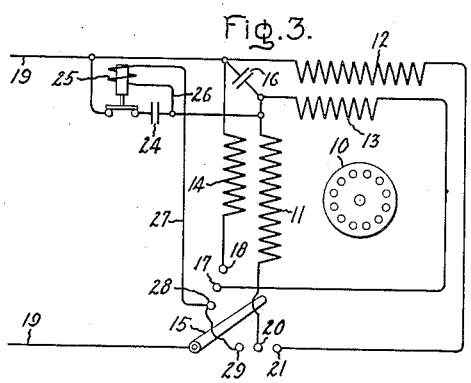

The features of my invention which are believed to be novel and patentable will be pointed out in the claims appended hereto. For a better understanding of my invention, reference is made in the following description to the accompanying drawing in which Fig. 1 represents the invention applied to a split-phase capacitor motor where the starting capacitor is left in circuit during normal operation; Fig. 2 represents the invention applied to a capacitor motor where the the starting capacitor is cut out during normal operation; and Fig. 3 represents the invention applied to a capacitor motor where only a portion of the capacity used for starting is used during normal operation.

Referring to the drawing in which like parts are designated by like reference numerals in the three figures, 10 represents the motor rotor of the squirrel cage variety, 11 and 12 represent stator primary windings of one pole number which are displaced about ninety degrees from each other, and 13 and 14 represent stator primary windings of another pole number which are likewise displaced about ninety degrees from each other. Windings 11 and 12 may be six-pole windings used for clockwise rotation and windings 13 and 14 may be four-pole windings for counterclockwise rotation. It will be evident then that the counterclockwise operating speed will be higher than clockwise operating speed. 15 represents a switch connected to one line terminal for selecting the direction of rotation of the motor and for energizing and deenergizing the motor.

In Fig. 1, 16 represents a phase-shifting device, such as a condenser, which is permanently connected between line terminal 30, common to one end of both main windings 12 and 14, and connection 31, common to one end of both starting windings 11 and 13. Condenser 16 serves as the phase-splitting means for both directions of rotation and speeds. This motor may be termed a permanent phase split motor because the condenser is used for starting as well as for power factor improvement when the motor is in operation. The starting winding and condenser remains in circuit during normal operation.

It will be noted that, with switch 15 on the contacts 17 and 18 leading to the other ends of windings 13 and 14, respectively, winding 14 is connected directly across the line 19 and winding 13 is connected across the line through condenser 16. The motor thus starts with winding 13 as the starting winding and runs counterclockwise as a four-pole motor. In the meantime, the six-pole windings 11 and 12 are open at contacts 20 and 21.

To start and operate clockwise as a six-pole motor, switch 15 is closed on contacts 20 and 21. This connects winding 12 directly across line 19, winding 11 across the line in series with condenser 16, and windings 13 and 14 are then open at contacts 17 and 18. It is thus seen that the condenser 16 serves for operation in both directions of rotation for the two different speeds with no change in connections except those accomplished by switch 15.

If it is desired that the six-pole operation be counterclockwise instead of clockwise, either winding 11 or 12 may be reversed. Likewise, if it is desirable that the four-pole operation be reversed, this may be accomplished by reversing either winding 13 or 14. A change in direction of four-pole operation only does not interfere with the direction of operation for six poles and vice versa. If it is desirable to reverse the direction of motor operation for both pole numbers, the simplest way to do it is to shift line terminal 30 to the common connection 31. Windings 12 and 14 are then used as starting windings and windings 11 and 13 as main windings. This method should be used only when the windings are properly designed for such operation.

Fig. 2 is similar to Fig. 1 except that I have provided an automatic switch 22 for cutting out the starting winding circuit with the condenser 16 after the motor has started. The automatic switch is operated by a centrifugal governor device 23 but might be otherwise operated. Where a centrifugal device is used, it should be arranged to open switch 22 at a speed below the minimum normal operating speed on the six-pole winding. It will open sooner than is necessary when starting on the high-speed four-pole winding but not too soon to seriously impair the split-phase starting operation of the motor.

Fig. 3 is similar to the arrangement of Fig. 1 with the addition of extra condenser 24 used during starting only together with an automatic relay switch 25 for cutting condenser 24 out of circuit as the motor reaches the proper speed for both the four or six-pole operation. The operating winding of relay switch 25 is energized in response to the voltage across the starting winding, which is selected for energization by switch 15. Thus the winding of relay 25 is connected on one side by wire 26 to one end of both starting windings 11 and 13 and by wire 27 to contacts 28 and 29 associated with switch 15. It is evident that, with switch 15 in the open position, as shown, relay 25 is deenergized as are likewise all motor windings. When switch 15 is closed on contacts 17, 18, and 28, the four-pole main winding 14 is connected across the line 19, the four-pole starting winding 13 is connected across the line in series with condensers 16 and 24 in parallel, and the energizing coil of the relay 25 is connected across starting winding 13, this being established through switch blade 15 and contacts 17 and 28. The motor thus starts and, as soon as the voltage across starting winding 13 increases, as it will when the motor approaches normal four-pole operating speed, relay switch 25 will pull up and cut out condenser 24, thus reducing the capacity to that represented by condenser 16 for normal operation.

When switch 15 is thrown to contacts 20, 21, and 29 for clockwise rotation, the six-pole main winding 12 is connected across the line, the six-pole starting winding 11 is connected in series with condensers 16 and 24 in parallel across the line, and the winding relay 25 becomes connected across starting winding 11 through switch blade 15 and contacts 20 and 29. The motor starts in a clockwise direction and, as it approaches normal six-pole operating speed, the voltage across winding 11 will increase to the operating voltage of relay 25 and it will pull up to cut out condenser 24, reducing the capacity to that represented by condenser 16 for normal six-pole operation.

The relay operating voltage across the starting windings for both directions of rotation will occur at approximately the same percentage of synchronous speed in each case and, consequently, can be readily made to occur at the proper speeds in each case. It will be evident that the starting and operating conditions for the different speeds and directions of rotation will be those normally present in well designed split-phase motors although the different speeds and directions of operation employ the same simple phase-splitting and control arrangement.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim is new and desire to secure by Letters Patent of the United States:

1. A split-phase motor having main and start windings of one pole number and main and start windings of another pole number, a line terminal connected to one end of each main winding, a connection between one end of each start winding, a circuit including a phase-shifting device connected between said terminal and said connection, a second line terminal, and an energizing switch for the motor for connecting said second line terminal to the other ends of the main and start windings of one pole number or to the other ends of the main and start windings of the other pole number.

2. A split-phase motor having main and start windings of one pole number and main and start windings of another pole number, a line terminal connected to one end of each main winding, a connection between one end of each start winding, a circuit including an automatic switch and a phase-shifting device connected between said line terminal and said connection, a second line terminal, a motor-energizing switch for selectively connecting said second line terminal to the other ends of the main and start windings of one pole number or to the other ends of the main and start windings of the other pole number, and means responsive to the speed of the motor for opening said automatic switch as the motor comes up to speed when operating on windings of either pole number.

3. A split-phase motor having main and start windings of one pole number and main and start windings of another pole number, a line terminal connected to one end of each main winding, a connection between one end of each start winding, a circuit including capacity connected between said terminal and said connection, a second line terminal, a motor-energizing switch for selectively connecting said second line terminal to the other ends of the main and start windings of one pole number or to the other ends of the main and start windings of the other pole number, and means responsive to the speed of the motor when operating on either pole number windings for reducing the value of said capacity as the motor approaches operating speed.

4. A reversible split-phase motor having main and start windings of one pole number for operating in one direction and main and start windings of another pole number for operating in the reverse direction, a line terminal connected to supply energy to one end of all of said windings, a phase-shifting device being included in the connection between said line terminal and the two start windings for shifting the phase of the current supplied therethrough, a second line terminal and an energizing switch for the motor adapted to connect said second line terminal to the other ends of the windings of one pole number for operating the motor in one direction at one speed and to connect said second line terminal to the other ends of the windings of the other pole number for operating the motor in the reverse direction at another speed.

5. A two-speed single-phase motor having main and start windings of two different pole numbers, a line terminal connected to supply energy to one end of all of said windings, a second line terminal, a motor-energizing switch for selectively connecting said second line terminal to the other ends of the windings of one pole number or to the other ends of the windings of the other pole number, the circuits thus established through the start windings including means for shifting the phase of the current therein with respect to the phase of the current in the main windings, and means for disconnecting the starting windings from said first mentioned terminal as the motor comes up to speed when operating on either pole number windings.

6. A two-speed split-phase motor having main and start windings of two different pole numbers, a line terminal connected to supply energy to one end of all four of the motor windings, a phase-modifying means being included in the connection between said terminal and the starting windings, a switch for modifying said phase-modifying means, a relay with its coil for operating said switch, a second line terminal, a manual-energizing switch for said motor for selectively connecting said second line terminal to the other ends of the windings of one pole number or to the other ends of the windings of the other pole number, and connections established by said manually-operated switch when thus selectively operated for connecting the coil of said relay across the starting winding which is selected for energization.

G. EBERHARD MICHELSEN.